(12) United States Patent
Bakke

(10) Patent No.: US 7,519,779 B2
(45) Date of Patent: Apr. 14, 2009

(54) DUMPING USING LIMITED SYSTEM ADDRESS SPACE

(75) Inventor: Brian E. Bakke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1306 days.

(21) Appl. No.: 10/228,036

(22) Filed: Aug. 26, 2002

(65) Prior Publication Data

US 2004/0039971 A1 Feb. 26, 2004

(51) Int. Cl.
*G06F 12/00* (2006.01)
(52) U.S. Cl. ................... 711/149; 711/169; 711/131
(58) Field of Classification Search ............ 711/131, 711/149, 169
See application file for complete search history.

(56) References Cited

U.S. PATENT DOCUMENTS

| | | | | |
|---|---|---|---|---|
| 4,065,810 A * | 12/1977 | Cramer et al. | ............... | 710/26 |
| 4,403,282 A * | 9/1983 | Holberger et al. | ............ | 710/22 |
| 4,782,439 A * | 11/1988 | Borkar et al. | ................ | 710/23 |
| 4,837,677 A * | 6/1989 | Burrus et al. | ............... | 710/308 |
| 4,949,246 A * | 8/1990 | O'Dell et al. | ............... | 710/307 |
| 5,111,384 A | 5/1992 | Aslanian et al. | | |
| 5,123,017 A | 6/1992 | Simpkins et al. | | |
| 5,142,672 A * | 8/1992 | Johnson et al. | ............... | 710/27 |
| 5,175,825 A * | 12/1992 | Starr | ........................ | 709/213 |
| 5,251,303 A * | 10/1993 | Fogg et al. | .................... | 710/24 |
| 5,416,907 A * | 5/1995 | Polzin et al. | .................. | 710/66 |
| 5,426,737 A * | 6/1995 | Jacobs | ......................... | 710/27 |
| 5,537,572 A | 7/1996 | Michelsen et al. | | |
| 5,634,099 A * | 5/1997 | Andrews et al. | ............ | 709/212 |
| 5,715,419 A | 2/1998 | Szczepanek et al. | | |
| 5,991,899 A | 11/1999 | Deacon | | |
| 6,070,210 A * | 5/2000 | Cheon | ......................... | 710/105 |
| 6,079,623 A | 6/2000 | Ahn et al. | | |
| 6,154,793 A * | 11/2000 | MacKenna et al. | ............ | 710/23 |
| 6,266,789 B1 | 7/2001 | Bucher et al. | | |
| 6,279,051 B1 * | 8/2001 | Gates et al. | ................... | 710/20 |
| 6,279,127 B1 | 8/2001 | Moore | | |
| 6,282,647 B1 | 8/2001 | Leung et al. | | |

(Continued)

FOREIGN PATENT DOCUMENTS

JP          5020136 A          1/1993

(Continued)

OTHER PUBLICATIONS

Notes on 1.0 Beta 2 (DIST11)—pp. 1-10 URL http://www.simics.com/support/README_1.0_Beta_2txt.

(Continued)

*Primary Examiner*—Matt Kim
*Assistant Examiner*—Sheng-Jen Tsai
(74) *Attorney, Agent, or Firm*—Patterson & Associates

(57) ABSTRACT

Method and apparatus for reading the internal address space of an adapter in a system during a dump are described. The adapter includes a control port and a data port used as channels for exchanging control messages and dump data between the adapter and the system. The system starts the dump by sending to the data port a specification of a block of the adapter's internal address space. In response, the adapter sends dump data portions to a system buffer via the data port.

23 Claims, 3 Drawing Sheets

U.S. PATENT DOCUMENTS 6,311,303 B1 10/2001 Gates et al.
6,408,354 B1* 6/2002 Young ........................ 710/313
2004/0054866 A1* 3/2004 Blumenau et al. ........... 711/202

FOREIGN PATENT DOCUMENTS

JP 9330253 A 12/1997
JP 2000035906 A 2/2002

OTHER PUBLICATIONS

UXP/V System Administration Training—Chapter 13—Troubleshooting pp. 13-1 to 13-7.
Compaq AlphaServer ES40 Release Notes, Oct. 1999, pp. 1-13.

* cited by examiner

DUMPING USING LIMITED SYSTEM ADDRESS SPACE

BACKGROUND OF THE INVENTION

1. Field of the Invention

The present invention generally relates to dumping, and more particularly to dumping using a limited address space.

2. Description of the Related Art

In a conventional computer system, an I/O (input/output) adapter may fail during runtime triggering a dump of the I/O adapter's internal address space for debugging purposes. More specifically, in response to an I/O adapter failure, the driver of the I/O adapter may cause a processor in the computer system to read the entire internal address space of the failed I/O adapter into a temporary buffer in system memory. In other cases, the driver may not anticipate the failure and, as a result, the system hangs. In such cases, the system operator can, via special hardware, cause the processor to read the dump data out of the I/O adapter's internal address space. The processor then stores the read data (dump data) from the temporary buffer into a nonvolatile storage device (usually a hard disk). The process of reading an I/O adapter's internal address space and storing the read data into a nonvolatile storage device is called a dump. Then, the content of the I/O adapter's internal address space is examined to determine the reason for the I/O adapter failure. This examining process is called debugging. The process of storing dump data into a nonvolatile storage device is simple. However, the process of reading an I/O adapter's internal address space is more problematic. This is because there may not be enough system address space for reading all internal address spaces of all I/O adapters in the system during a dump. In addition, the I/O adapter failure may disable the I/O adapter function(s) for providing dump data to the system.

One first prior art method for reading an I/O adapter's internal address space during a dump comprises mapping the I/O adapter's entire internal address space into the system address space. Then, a processor reads from each location of the I/O adapter's internal address space by issuing the system address of the location on the system's address bus. For illustration of this first prior art method, assume an I/O adapter with an internal address space of 1 Mbytes fails to operate during runtime. The I/O adapter's internal address space of 1 Mbytes is mapped into a system address space range of, illustratively, A0000000h-A00FFFFFh (1 Mbyte range) in the system address space. Then, a processor in the system reads from system address A0000000h to access the first byte of the I/O adapter's internal address space, reads from system address A0000001h to access the second byte of the I/O adapter's internal address space, and so on until the last byte of the I/O adapter's internal address space is read.

This first prior art method requires a relatively large portion of system address space (1 Mbytes in the illustration above) for reading the I/O adapter's internal address space, which is problematic. New technologies lead to new I/O adapters with larger internal address spaces (as much as 512 Mbytes or more per I/O adapter). In addition, the number of I/O adapters in the system increases, while the system address space is fixed at 4 Gbytes (assuming a 32-bit system address bus). Assume a dump of all I/O adapters' internal address spaces is required for debugging. Each I/O adapter's internal address space must be mapped into an exclusive system address space range. As a result, if the total internal address space of all I/O adapters in the system exceeds the system address space, there is not enough system address space to map all internal address spaces of all the I/O adapters in the system. This results in a loss of dump data, which is undesirable.

A second prior art method for reading an I/O adapter's internal address space during a dump requires the system to send a dump message to the I/O adapter. The dump message informs the I/O adapter of the area of the I/O adapter's internal address space to be dumped and the system buffer (in system memory) into which the dump data should be sent. In response, the I/O adapter retrieves and sends the requested dump data to the indicated system buffer. In order to do this, the I/O adapter must be capable of (a) generating control signals, addresses, and data on the bus on which it resides and (b) signaling the system when the I/O adapter finishes sending the requested dump data to the indicated system buffer. For example, assume the dump message from the system specifies to the I/O adapter a system buffer at addresses D0000000h-D000FFFFh. In order to send the first byte of dump data, the I/O adapter has to put address D0000000h and the first dump data byte on the bus. In addition, the I/O adapter has to assert one or more control signals to indicate to the system that the address and data on the bus are valid. In other words, the I/O adapter must be able to perform the functions of a bus master. However, the more functions required of an adapter to perform a dump, the more likely that the I/O adapter will be unable to send dump data to the system buffer when the I/O adapter encounters a failure. The reason is that it is likely that the failure disables one of the functions required for the I/O adapter to send dump data to the system buffer. As a result, the second prior art method is also undesirable.

Accordingly, there is a need for an apparatus and method for reading an I/O adapter's internal address space during a dump which overcomes shortcomings existing in the prior art.

SUMMARY OF THE INVENTION

In one embodiment, a method is described for reading an I/O adapter's internal address space during a dump. The method comprises (a) providing a data port in the I/O adapter, (b) sending to the data port an address token specifying a block of the internal address space of the I/O adapter to be read, (c) putting, by the I/O adapter, in the data port, a data portion of the block, (d) and reading from the data port the data portion.

In another embodiment, a digital system for reading an I/O adapter's address space during a dump is described. The I/O adapter includes a data port, wherein (a) the system is configured to send to the data port an address token specifying a block of the internal address space of the I/O adapter to be read, (b) the I/O adapter is configured to put in the data port a data portion of the block; and (c) the system is further configured to read from the data port the data portion.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments are provided in which a method is described for reading the internal address space of an I/O adapter in a system during a dump. The I/O adapter includes a control port and a data port used as channels for exchanging control messages, address information, and dump data between the I/O adapter and the system. The system starts the dump by sending to the data port a specification of a block of the I/O adapter's internal address space. In response, the I/O adapter successively sends dump data portions to the data port and the system successively reads the dump data portions from the data port.

Figure 1:
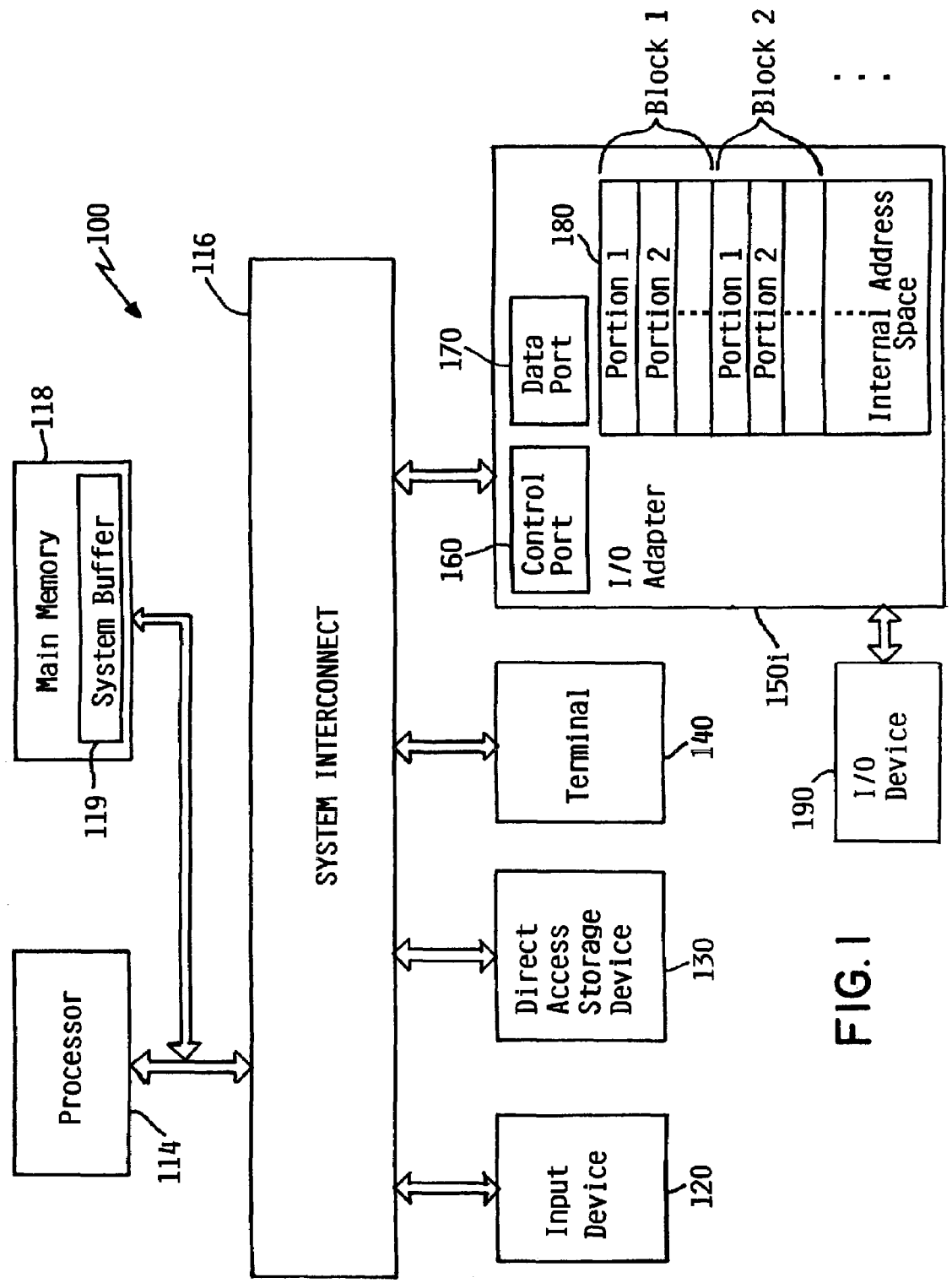
FIG. 1 is a digital system 100 according to one embodiment.

FIG. 1 is a computer system 100 according to an embodiment of the invention. In general, the computer system 100 may be a desktop or PC-based computer, a workstation, a network terminal, or other networked computer system. Illustratively, the computer system 100 includes a system interconnect 116. The computer system 100 also includes at least a processor 114, a main memory 118, an input device 120, a storage device 130, a terminal 140, and at least one I/O adapter 150i; all coupled to system interconnect 116. The I/O adapter 150i may couple no I/O device or at least one I/O device 190 to the system interconnect 116.

In one embodiment, the I/O device 190 may have a built-in I/O adapter and therefore can be coupled directly to the system interconnect 116. In other words, each I/O device (such as the input device 120, the storage device 130, and the terminal 140) in the system 100 may either need an I/O adapter through which to interface to the system interconnect 116 or interface directly to the system interconnect 116 if the I/O device has a built-in I/O adapter.

Terminal 140 is any display device such as a cathode ray tube (CRT) or a plasma screen. Input device 120 can be any device to give input to the computer system 100. For example, a keyboard, keypad, light pen, touch screen, button, mouse, track ball, or speech recognition unit could be used. Further, although shown separately from the input device, the terminal 140 and input device 120 could be combined. For example, a display screen with an integrated touch screen, a display with an integrated keyboard or a speech recognition unit combined with a text speech converter could be used.

Storage device 130 is DASD (Direct Access Storage Device), although it could be any other storage such as floppy disc drives or optical storage. Although storage 130 is shown as a single unit, it could be any combination of fixed and/or removable storage devices, such as fixed disc drives, floppy disc drives, tape drives, removable memory cards, or optical storage. Main memory 118 and storage device 130 could be part of one virtual address space spanning multiple primary and secondary storage devices.

The contents of main memory 118 can be loaded from and stored to the storage device 130 as the processor 114 has a need for it. Main memory 118 is any memory device sufficiently large to hold the necessary programming and data structures of the invention. The main memory 118 could be one or a combination of memory devices, including random access memory (RAM), non-volatile or backup memory such as programmable or flash memory or read-only memory (ROM). The main memory 118 may be physically located in another part of the computer system 100. While main memory 118 is shown as a single entity, it should be understood that memory 118 may in fact comprise a plurality of modules, and that main memory 118 may exist at multiple levels, from high speed to low speed memory devices.

The I/O adapter 150i, illustratively, comprises a control port 160 and a data port 170. These two ports 160 and 170 are used in the communication between the processor 114 and the I/O adapter 150i during a dump of the I/O adapter 150i. More specifically, the processor 114 and the I/O adapter 150i use the control port 160 as a channel through which to send control messages to each others. Each of the processor 114 and the I/O adapter 150i also monitor the content of the control port 160 for any control message from the other. The processor 114 uses the data port 170 as a channel through which to send address information to the I/O adapter 150i. The I/O adapter 150i sends dump data to the data port 170 and the processor 114 reads the dump data from the data port 170.

In one embodiment, the control port 160 and data port 170 are implemented as registers at two separate locations in the system address space. For example, the control port 160 can be implemented at system addresses B0000000h through B0000003h in the system address space. The processor 114 can access the control port 160 by issuing the address B0000000h on the processor address bus. Similarly, the data port 170 can be implemented at system addresses B0000004h through B0000007h in the system address space. The processor 114 can access the data port 170 by issuing the address B0000004h on the processor address bus.

The sizes of the ports 160 and 170 can be flexible. In the example above, both the control port 160 and data port 170 are 32 bits (4 bytes) wide. In this example, the processor 114 and the I/O adapter 150i can exchange one 32-bit message at a time via the control port 160. Accordingly, there are $2^{32}$ different possible messages which the processor 114 and the I/O adapter 150i can exchange via the control port 160. Similarly, the processor 114 can read from the I/O adapter 150i one dump data portion of up to 4 bytes (i.e., the size of the data port 170) at a time via the data port 170. In one embodiment, the sizes of the control port 160 and the data port 170 are the same as that of the data bus on which the I/O adapter 150i resides to utilize to the maximum the capacity of the data bus.

In one embodiment, the I/O adapter 150i and its components including the control port 160 and the data port 170 occupy an internal address space 180. The internal address space 180 comprises a plurality of blocks (block 1, block 2, . . . ) Each of the blocks comprises a plurality of data portions (portion 1, portion 2, . . . )

In one embodiment, reading the internal address space 180 of the I/O adapter 150i during a dump of the I/O adapter 150i starts with the processor 114 sending a request for a dump to the control port 160. In response to the dump request in the control port 160, the I/O adapter 150i sends an acknowledge message to the control port 160. In response to the acknowledgement, the processor 114 sends to the data port 170 an address token identifying a block of the internal address space of the I/O adapter 150i to be read. In addition, the processor 114 sends to the control port 160 a message indicating to the I/O adapter 150i that the data port 170 is holding a valid address token. In response, the I/O adapter 150i retrieves and sends a first dump data portion of the block to the data port 170. In addition, the I/O adapter 150i sends to the control port 160 a message indicating to the processor 114 that the data port 170 is holding a valid dump data portion. In response, the processor 114 reads the first dump data portion from the data port 170. In addition, the processor 114 sends to the control port 160 a message indicating to the I/O adapter 150*i* that the dump data portion in the data port 170 has been read. In response, the I/O adapter 150*i* retrieves and sends a second dump data portion to the data port 170. In addition, the I/O adapter 150*i* sends to the control port 170 a message indicating to the processor 114 that the data port 160 is holding a valid dump data portion. In response, the processor 114 reads the second dump data portion from the data port 170. In addition, the processor 114 sends to the control port 160 a message indicating to the I/O adapter 150*i* that the dump data portion in the data port 170 has been read. The exchange of dump data portions and handshake messages between the processor 114 and the I/O adapter 150*i* continues until the last dump data portion of the block is read by the processor 114.

Figure 2:
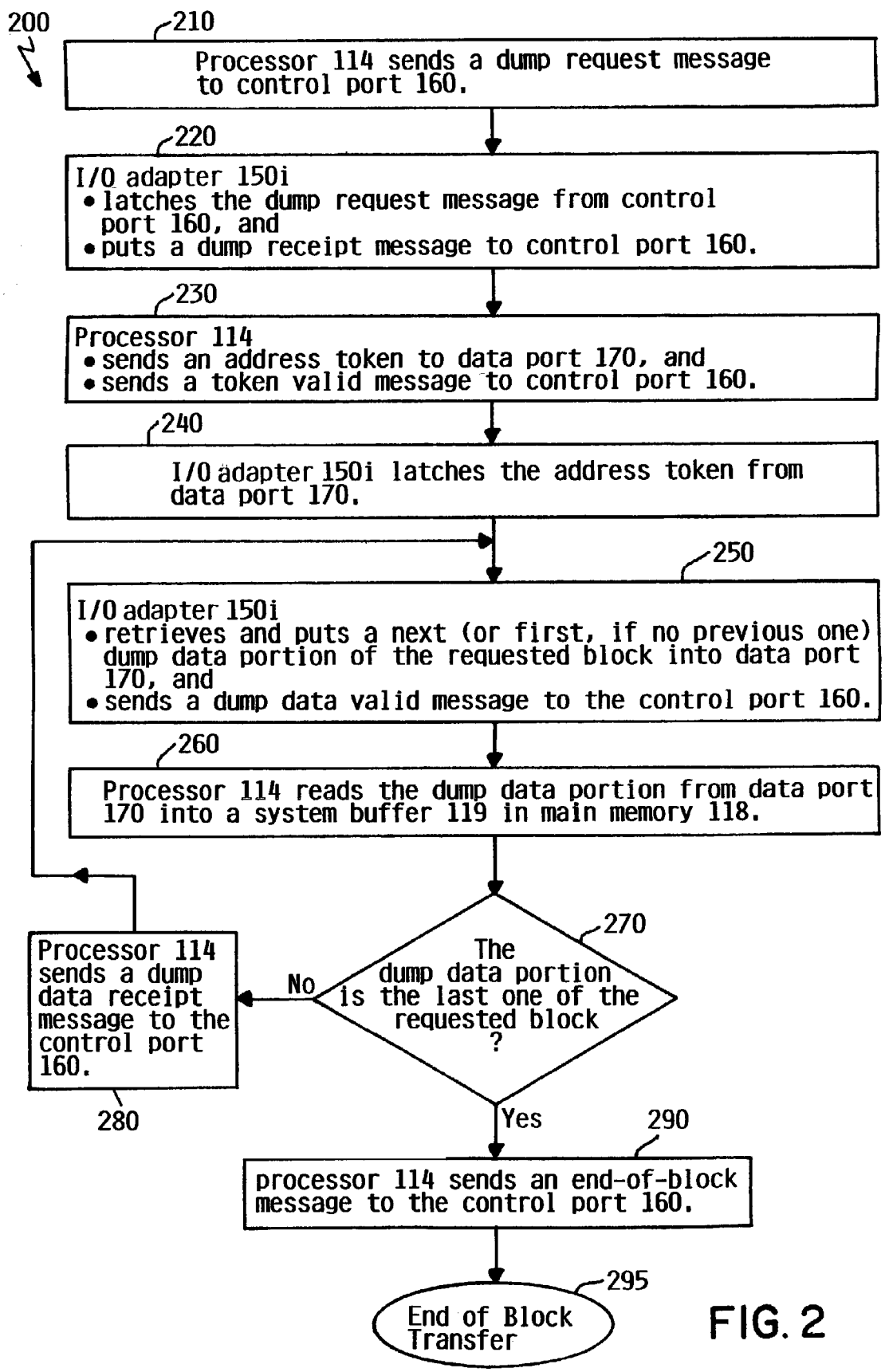
FIG. 2 shows the flowchart of a method 200 according to one embodiment.

FIG. 2 shows the flow chart of a method 200 according to one embodiment of the present invention. The method 200 can be used to read a block of dump data from the I/O adapter 150*i*. The block may cover the entire internal address space 180 of the I/O adapter 150*i* or only a portion of it. The method 200 begins at step 210 where the processor 114 sends to the control port 160 a dump request message indicating to the I/O adapter 150*i* that the processor 114 is requesting a dump of a block of the internal address space 180 of the I/O adapter 150*i*. In response, at step 220, the I/O adapter 150*i* latches the dump request message from control port 160, and then puts a dump receipt message to control port 160. The dump receipt message is used to indicate to the processor 114 that the I/O adapter 150*i* has received the dump request message and is ready to receive further instructions.

In one embodiment, at step 230, the processor 114, monitoring the control port 160, responds by sending an address token to the data port 170. In one embodiment, the address token may be a message to the I/O adapter 150*i* specifying a block of the internal address space 180 of the I/O adapter 150*i* to be read by the processor 114 via the data port 170. For example, an address token may specify the start location and the end location of a block in the internal address space 180 of the I/O adapter 150*i* to be read by the processor 114. In another embodiment, the address token may be an identifier that is understood by both the system 100 and the I/O adapter 150*i*. For example, the address token may contain one or more internal addresses of the I/O adapter 150*i*.

In one embodiment, in addition to sending the address token to the data port 170, the processor 114 sends a token valid message to the control port 160, indicating to the I/O adapter 150*i* that the processor 114 has sent an address token to the data port 170. At step 240, the I/O adapter 150*i*, monitoring the control port 160, responds by latching the address token from the data port 170. Then, at step 250, the I/O adapter 150*i* retrieves and puts a first dump data portion of the requested block into the data port 170. In addition, the I/O adapter 150*i* sends a dump data valid message to the control port 160. The dump data valid message is used to indicate to the processor 114 that there is a valid dump data portion at the data port 170. At step 260, the processor 114, monitoring the control port 160, responds by reading the first dump data portion from the data port 170 into a system buffer 119 in main memory 118.

In one embodiment, at step 270, a determination is made as to whether the dump data portion which the processor 114 has just read is the last one of the requested block. If not, at step 280, the processor 114 sends a dump data receipt message to the control port 160, and the method 200 loops back to step 250. The dump data receipt message is used to indicate to the I/O adapter 150*i* that the processor 114 has read the first dump data portion of the requested block from the data port 170.

After step 280, at step 250, the I/O adapter 150*i*, monitoring the control port 160, responds by retrieving and putting a second dump data portion of the requested block into the data port 170. In addition, the I/O adapter 150*i* sends a dump data valid message to the control port 160 to indicate to the processor 114 that there is a valid dump data portion at the data port 170. At step 260, the processor 114, monitoring the control port 160, responds by reading the second dump data portion from the data port 170 into the system buffer 119 in main memory 118.

The transfer of dump data portions from the I/O adapter 150*i* continues in such manner through the loop of steps 250, 260, 270, and 280 until the last dump data portion of the requested block is read by the processor 114 from the data port 170 into the system buffer 119. Then, step 270 is answered affirmatively, and the method 200 proceeds to step 290. At step 290, the processor 114 sends an end-of-block message to the control port 160 and the method 200 stops at step 295. The end-of-block message is used to indicate to the I/O adapter 150*i* that the requested block of the internal address space 180 of the I/O adapter 150*i* has been read.

In one embodiment, the processor 114 may send to the control port 160 only one address token specifying a block covering the entire internal address space 180 of the I/O adapter 150*i*. In another embodiment, the processor 114 may send to the control port 160 a first address token specifying a first block covering only part of the entire internal address space 180 of the I/O adapter 150*i*. After the last dump data portion of the first block is transferred, the processor 114 sends to the control port 160 a second address token specifying a second block covering a contiguous part of the internal address space 180 of the I/O adapter 150*i*. After the last dump data portion of the second block is transferred, the processor 114 sends to the control port 160 a third address token, and so on until the entire (or some desired portion of) internal address space 180 of the I/O adapter 150*i* is read.

In one embodiment, after reading all the dump data portions of the first block into the system buffer 119 in main memory 118, the processor 114 stores the entire first block of dump data from system buffer 119 into the storage device 130. Then, the processor 114 reads all the dump data portions of the second, contiguous block into the system buffer 119 and subsequently stores the entire second block of dump data from system buffer 119 into the store device 130. The processor 114 keeps reading and storing contiguous blocks of dump data until all dump data is transferred.

In one embodiment, the processor 114 may start the dump of the internal address space 180 of the I/O adapter 150*i* by sending the address token to the data port 170 and the token valid message to the control port 160, without first sending the dump request message to the control port 160. In this embodiment, the I/O adapter 150*i* may be configured to recognize the token valid message in the control port 160 as a request for a dump.

Figure 3:
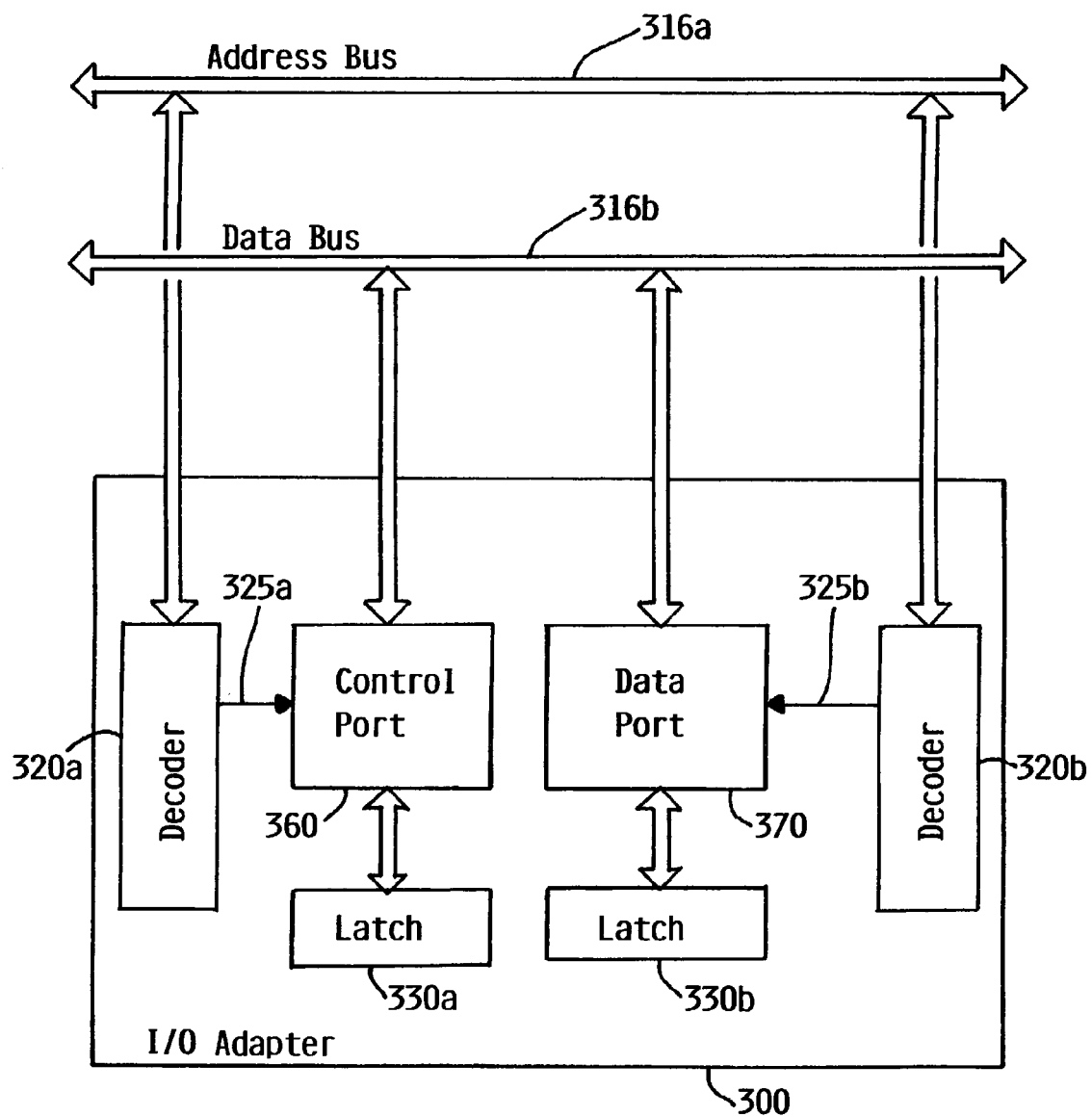
FIG. 3 shows an I/O adapter 300 as one embodiment of the I/O adapter 150i of FIG. 1.

FIG. 3 shows an I/O adapter 300 as one embodiment of the I/O adapter 150*i* of FIG. 1. Illustratively, the I/O adapter 300 comprises a control port 360, a data port 370, decoders 320*a* and 320*b*, and latches 330*a* and 330*b*. The control port 360 and the data port 370 are coupled to a data bus 316*b*. The control port 360 and the data port 370 are also coupled to latches 330*a* and 330*b*l The decoders 320*a* and 320*b* are coupled to an address bus 316*a*. The address bus 316*a* and the data bus 316*b* may be part of the system interconnect 116 of FIG. 1.

The decoder 320*a* is configured to assert a first enable signal to the control port 360 via a connection 325*a* if the system address of the control port 360 appears on the address bus 316a. If not, the decoder 320a deasserts the first enable signal. Similarly, the decoder 320b is configured to assert a second enable signal to the data port 370 via a connection 325b if the system address of the data port 370 appears on the address bus 316a. If not, the decoder 320b deasserts the second enable signal.

In one embodiment, steps 210, 220, and 230 of the method 200 of FIG. 2 can be performed as follows. At step 210, the processor 114 puts the dump request message on the data bus 316b and puts the system address of the control port 360 on the address bus 316a. In response, the decoder 320a asserts the first enable signal on connection 325a and the dump request message on the data bus 316b is strobed into the control port 360. Then, the processor 114 executes a program loop reading from and monitoring the control port 360. In other words, the processor 114 keeps checking the control port 360 for any message from the I/O adapter 300. The processor 114 may read from the control port 360 by putting the system address of the control port 360 on the address bus 316a and reading the content of the control port 360 via the data bus 316b.

At step 220, the I/O adapter 300 latches a copy of the dump request message from the control port 360 into the latch 330a. Recognizing the dump request message in the latch 330a, the I/O adapter 300 put the dump receipt message into the control port 360 and then monitors the control port 360 for any future message from the processor 114.

At step 230, the processor 114, monitoring the control port 360, recognizes the dump receipt message in the control port 360 and responds by sending the address token to data port 370 and the token valid message to control port 360.

The processor 114 sends the address token to the data port 370 by issuing the system address of the data port 370 to the address bus 316a and the address token on the data bus 316b. In response to the system address of the data port 370 present on the address bus 316a, the decoder 320b asserts the second enable signal on connection 325b and the address token on the data bus 316b is strobed into the data port 370. Then, the processor 114 sends the token valid message to the control port 360 by issuing the system address of the control port 360 to the address bus 316a and the token valid message on the data bus 316b. In response to the system address of the control port 360 present on the address bus 316a, the decoder 320a asserts the first enable signal on connection 325a and the token valid message on the data bus 316b is strobed into the control port 360. Then, the processor 114 executes a program loop reading from the control port 360 (i.e., monitoring the control port 360). Other steps of the method 200 of FIG. 2 can be implemented using the I/O adapter 300 of FIG. 3 in a similar manner.

In summary, through asynchronous handshake protocol, dump data of the entire internal address space 180 of the I/O adapter 150i can be transferred from the I/O adapter 150i to the system buffer 119 using the control port 160 and the data port 170 (FIG. 1). The ports 160 and 170 occupy a very limited area of the system address space. For example, a 32-bit control port 160 located at system addresses C0000000h-C0000003h and a 32-bit data port 170 located at system addresses C0000004h-C0000007h are sufficient for the embodiments described above. In this example, the two ports occupy only 8 bytes of the large (usually 4 Gbytes) system address space. As a result, a dump of many adapters having large internal address spaces (e.g., graphic adapters) does not require a large system address space.

In addition, the I/O adapter 150i is only required to be capable of reading and writing to its two ports 160 and 170. The I/O adapter 150i does not have to be capable of generating addresses, control signals, and data to the system interconnect 116 and signaling the system 100 when the I/O adapter 150i finishes sending the requested dump data to the indicated system buffer 119. As a result, in a case of I/O adapter failure, it is more likely that the I/O adapter 150i is still capable of carrying out the dump as described in the embodiments above.

While the foregoing is directed to embodiments of the present invention, other and further embodiments of the invention may be devised without departing from the basic scope thereof, and the scope thereof is determined by the claims that follow.

What is claimed is:

1. A method of reading internal addresses space of an adapter having a data port at an address, comprising:
   enabling the data port, in response to detecting a system address of the data port on an address bus, by the adapter;
   sending to the data port a first address token specifying a first block of the internal address space of the adapter to be read, wherein the first block comprises a plurality of data portions;
   sending to a control port of the adapter, a message indicating the presence of the first address token in the date port;
   responsive to receipt of the first address token and the message by the adapter: putting, by the adapter, a first data portion of the first block in the data port;
   putting, by the adapter, a data validation message in a control port, the data validation message indicating the presence of the first data portion of the first block in the data port;
   detecting, by a processor monitoring the control port, the data validation message in the control port; and
   responsive to detecting the data validation message by the processor: reading, by the processor, the first data portion from the data port.

2. The method of claim 1, further comprising:
   putting, by the adapter, in the data port a second data portion of the first block;
   reading the second data portion from the data port; and
   sequentially putting, by the adapter, consecutive data portions of the first block on the data port and then reading from the data port.

3. The method of claim 2, further comprising:
   sending to the data port a second address token specifying a second block of the internal address space of the adapter to be read if the first block does not cover the entire internal address space of the adapter;
   putting, by the adapter, in the data port a third data portion of the second block; and
   reading the third data portion from the data port.

4. The method of claim 3, further comprising:
   putting, by the adapter, in the data port a fourth data portion of the second block;
   reading the fourth data portion from the data port; and
   sequentially putting, by the adapter, consecutive data portions of the second block on the data port and then reading from the data port.

5. The method of claim 3, wherein the second block is contiguous to the first block.

6. The method of claim 5, wherein the first address token specifies a start address and an end address of the first block.

7. The method of claim 1, wherein the first address token specifies a start address and an end address of the first block.

8. The method of claim 1, further comprising, after reading the first data portion from the data port, sending to the control port a dump data receipt message indicating that reading of the first data portion from the data port has been performed.

9. The method of claim 1, wherein the sending, putting and reading are performed to carry out a dump of the internal address space of the adapter.

10. A system, comprising an adapter including a data port, wherein:
the system is configured to:
address the data port by presenting an address of the data port on an address bus;
send to the data port a first address taken specifying a first block of the internal address space of the adapter to be read;
address a control port of the adapter by presenting an address of the control port on the address bus; and
send to the control port a message specifying the presence of the first address token in the data port;
the adapter is configured to:
enable the data port in response to detecting the address of the data port on the address bus;
latch the first address token from the data port in response to detecting the message in the control port;
put the first data portion of the first block in the data port; and
put a data validation message in the control port, the data validation message indicating the presence of the first data portion of the first block in the data port; and
the system is further configured to:
monitor the control port for the validation message; and
read the first data portion from the data port in response to detecting the validation message in the control port.

11. The system of claim 10, wherein:
the adapter is further configured to put in the data port a second data portion of the first block;
the system is further configured to read the second data portion from the data port; and
the adapter and the system are further configured to, respectively, put in the data port and read from the data port one dump data portion after another until the first block has been read.

12. The system of claim 11, wherein:
the system is further configured to send to the data port a second address token specifying a second block of the internal address space of the adapter to be read if the first block does not cover the entire internal address space of the adapter;
the adapter is further configured to put in the data port a third data portion of the second block; and
the system is further configured to read the third data portion from the data port.

13. The system of claim 12, wherein:
the adapter is further configured to put in the data port a fourth data portion of the second block;
the system is further configured to read the fourth data portion from the data port; and
the adapter and the system are further configured to, respectively, put in the data port and read from the data port one dump data portion after another until the second block has been read.

14. The system of claim 12, wherein the second block is contiguous to the first block.

15. The system of claim 14, wherein the first address token specifies a start address and an end address of the first block.

16. The system of claim 10, wherein the first address token specifies a start address and an end address of the first block.

17. The system of claim 10, the system is further configured to send to the control port a dump data receipt message indicating that reading of the first data portion from the data port has been performed.

18. A method of performing a dump of internal address space of an adapter, comprising:
enabling a data port of the adapter, in response to detecting a system address of the data port on an address bus, by the adapter;
sending to the data port an address token specifying a block of the internal address space of the adapter to be read, wherein the block comprises a plurality of data portions;
enabling a control port of the adapter, in response to detecting, by the adapter, a system address of the control port on an address bus;
sending to the control port a token valid message indicating that the address token is valid in the data port;
putting, by the adapter, in the data port a first data portion of the block in response to the token valid message present at the control port;
putting, by the adapter, in the control port a first dump data valid message indicating that the first data portion is valid at the data port in addition to the adapter putting the first data portion in the data port;
monitoring, by a processor, the control port for the presence of the first dump data valid message; and
reading the first data portion from the date port in response to the first dump data valid message present in the control port.

19. The method of claim 18, further comprising:
sending to the control port a dump data receipt message indicating that rending of the first data portion from the data port has been performed;
putting, by the adapter, in the data port a second data portion of the block in response to the dump data receipt message present at the control port;
putting, by the adapter, in the control port a second dump data valid message indicating that the second data portion is valid at the data port in addition to the adapter putting the second data portion in the data port; and
reading the second data portion from the data port in response to the second dump data valid message present in the control port; and
sequentially putting, by the adapter, consecutive data portions of the first block on the data port and then reading from the data port until the block has been read.

20. The method of claim 19, wherein the block covers entirely the internal address space of the adapter.

21. A system, comprising:
a processing unit;
an I/O adapter comprising internal memory defining at least one block comprising a plurality of contiguous memory areas wherein each block is identified by an address token and wherein the I/O adapter has (i) an associated control port for communicating messages between the processing unit and the I/O adapter and (ii) data port for receiving address information from the processing unit and for placing dump data from internal memory of the I/O adapter to be read by the processing unit; and
a memory defining system address space having the control port and the data port mapped therein;
wherein, upon failure of the I/O adapter:
the processing unit is configured to address the data port by presenting an address of the data port on an address bus and write, into the data port, the address token of the at least one block; and the I/O adapter is configured to:
(i) enable the data port in response to detecting the address of the data port on the address bus,
(ii) read the address token from the data port,
(iii) successively place the data of each of the plurality of contiguous memory areas on the data port, and
(iv) place a validation message in the control port which, when detected by the processor monitoring the control port, causes the processor to read the data in the data port.

22. The system of claim 21, wherein the processing unit is configured to successively read, from the data port, the plurality of contiguous memory areas placed on the data port by the I/O adapter.

23. The system of claim 22, wherein the processing unit and I/O adapter are configured to perform handshakes between each successive exchange of each of the plurality of the contiguous memory areas.

* * * * *